(12) United States Patent
Sasaki

(10) Patent No.: US 7,991,227 B2
(45) Date of Patent: Aug. 2, 2011

(54) COLOR ADJUSTMENT APPARATUS AND COMPUTER-READABLE MEDIUM

(75) Inventor: Makoto Sasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 882 days.

(21) Appl. No.: 12/000,866

(22) Filed: Dec. 18, 2007

(65) Prior Publication Data

US 2008/0304739 A1    Dec. 11, 2008

(30) Foreign Application Priority Data

Jun. 6, 2007 (JP) ................. 2007-150584

(51) Int. Cl.
*G06K 9/00* (2006.01)
*G03F 3/08* (2006.01)

(52) U.S. Cl. ..................................................... 382/167

(58) Field of Classification Search .................. 382/162, 382/164, 165, 167, 181, 190, 197, 199, 254; 345/552, 589–591, 594, 600–604, 649; 348/488, 348/603, E9.055; 358/1.9, 515, 518, 523, 358/525, 527, 530

See application file for complete search history.

(56) References Cited

U.S. PATENT DOCUMENTS

| | | | | |
|---|---|---|---|---|
| 4,945,495 A | * | 7/1990 | Ueda | 345/552 |
| 5,852,673 A | * | 12/1998 | Young | 382/164 |
| 5,909,291 A | * | 6/1999 | Myers et al. | 358/523 |
| 6,504,551 B1 | * | 1/2003 | Takashima et al. | 345/649 |
| 7,081,900 B2 | * | 7/2006 | Gonsalves et al. | 345/594 |
| 7,333,237 B2 | * | 2/2008 | Ogatsu et al. | 358/1.9 |
| 2002/0126302 A1 | | 9/2002 | Fukao | |
| 2004/0057614 A1 | | 3/2004 | Ogatsu et al. | |
| 2004/0151370 A1 | | 8/2004 | Sasaki | |
| 2004/0165772 A1 | | 8/2004 | Russell et al. | |
| 2005/0276474 A1 | * | 12/2005 | Um et al. | 382/167 |
| 2006/0119910 A1 | | 6/2006 | Sasaki | |
| 2008/0304739 A1 | * | 12/2008 | Sasaki | 382/167 |
| 2010/0104179 A1 | * | 4/2010 | Tin | 382/167 |
| 2010/0253954 A1 | * | 10/2010 | Bonnier et al. | 358/1.9 |

FOREIGN PATENT DOCUMENTS

| | | |
|---|---|---|
| CN | 1484105 A | 3/2004 |
| CN | 1523898 A | 8/2004 |
| JP | A-2002-223366 | 8/2002 |
| JP | A-2004-112694 | 4/2004 |

(Continued)

OTHER PUBLICATIONS

Office Action issued in Chinese Patent Application No. 200810006005, on Apr. 29, 2010 (with translation).

(Continued)

*Primary Examiner* — Amir Alavi
(74) *Attorney, Agent, or Firm* — Oliff & Berridge, PLC

(57) ABSTRACT

A color adjustment apparatus includes a subspace setting unit, a non-adjustment region setting unit and a color adjustment unit. The subspace setting unit sets a subspace in a color space. The subspace includes an adjustment subject color, which is an adjustment source, and a target color representing an adjustment destination. The non-adjustment region setting unit sets a non-adjustment region in the color space. A color adjustment is not performed in the non-adjustment region. The color adjustment unit performs the color adjustment for colors in the subspace set by the subspace setting unit, based on a reference vector directing from the adjustment subject color to the target color.

8 Claims, 11 Drawing Sheets

FOREIGN PATENT DOCUMENTS

| | | |
|---|---|---|
| JP | A-2004-254303 | 9/2004 |
| JP | A-2006-033196 | 2/2006 |
| JP | A-2006-135628 | 5/2006 |
| JP | A-2006-155595 | 6/2006 |

OTHER PUBLICATIONS

Office Action dated Mar. 7, 2011 issued in Japanese Patent Application No. 2007-150584 (with translation).

* cited by examiner

COLOR ADJUSTMENT APPARATUS AND COMPUTER-READABLE MEDIUM

CROSS-REFERENCE TO RELATED APPLICATIONS

This application is based on and claims priority under 35 U.S.C. §119 from Japanese Patent Application No. 2007-150584 filed on Jun. 6, 2007.

BACKGROUND

1. Technical Field

The invention relates to a color adjustment apparatus and a computer-readable medium.

2. Related Art

There is a demand for adjusting a specific color in a color image. In a natural image, a flesh color of a person, blue of the sky, and green of grass are called a memory color. For example, it would be more desirable to adjust the memory colors to colors that are preferable to a person who observes the image, rather than reproducing the memory colors with high accuracy. Such an adjustment method of adjusting a specific color involves a higher degree of difficulty than an adjustment method in which a color balance is adjusted for the entire image. Moreover, other methods that employ gradation conversion or a simple formula for calculating a correction may adjust colors other than the specific color to be adjusted.

For example, JP 2004-112694 A (US 2004/0057614 A) describes a color adjustment method in which a specific color, but not limited to the memory color, is adjusted without other colors being affected. FIG. 16 is an explanatory diagram showing an example of a color adjustment method of the related art. In the example shown in FIG. 16, an adjustment subject color is adjusted to a target color. When the adjustment subject color is merely adjusted to the target color, discontinuity may occur between the adjusted color and neighboring colors. To prevent such discontinuity, a subspace is set to include the adjustment subject color and the target color, and the color adjustment is performed in accordance with positions of colors in the subspace. Specifically, color continuity is preserved by changing the adjustment subject color to the target color and not changing colors on a boundary of the subspace using a reference vector directing from the adjustment subject color to the target color. Then, movement amounts for other colors are determined, and the color adjustment is performed.

With such a color adjustment, the adjustment subject color can be adjusted to the target color while it is ensured that the colors outside the subspace remain unchanged before and after the color adjustment and that continuity of colors inside the subspace and on the boundary of the subspace. As a result, a color such as blue of the sky or green of grass can be adjusted and reproduced with a color (target color) that is preferable to a person who observes an image without other colors being affected.

SUMMARY

According to an aspect of the invention, a color adjustment apparatus includes a subspace setting unit, a non-adjustment region setting unit and a color adjustment unit. The subspace setting unit sets a subspace in a color space. The subspace includes an adjustment subject color, which is an adjustment source, and a target color representing an adjustment destination. The non-adjustment region setting unit sets a non-adjustment region in the color space. A color adjustment is not performed in the non-adjustment region. The color adjustment unit performs the color adjustment for colors in the subspace set by the subspace setting unit, based on a reference vector directing from the adjustment subject color to the target color.

BRIEF DESCRIPTION OF THE DRAWINGS

Exemplary embodiments of the invention will be described in detail below with reference to the accompanying drawings, wherein.

DETAILED DESCRIPTION

Figure 1:
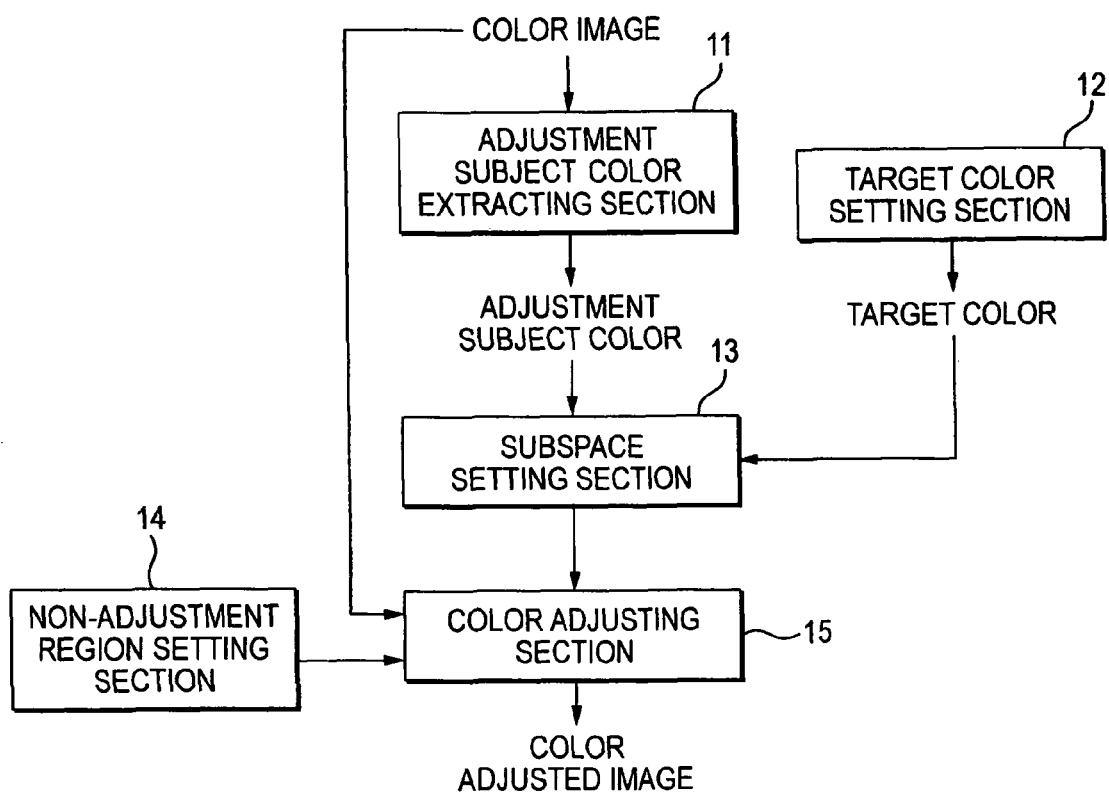
FIG. 1 is a block diagram showing an exemplary embodiment of the invention.

FIG. 1 is a block diagram showing an exemplary embodiment of the invention. In the drawings, reference numeral 11 is an adjustment subject color extracting section, reference numeral 12 is a target color setting section, reference numeral 13 is a subspace setting section, reference numeral 14 is a non-adjustment region setting section, and reference numeral 15 is a color adjusting section.

The adjustment subject color extracting section 11 extracts, from a color image, an adjustment subject color as a color to be adjusted. For example, if a flesh color of a person is to be adjusted, the flesh color is extracted from an image of the person. Extraction of the adjustment subject color may be performed using a method described in JP 2006-155595 A, for example, the entire contents of which are incorporated herein by reference. Specifically, respective color component ratios of different color components may be calculated among plural color components that represent colors of pixels in a color image, and colors that exists in clusters may be extracted from a color component ratio space. Alternatively, the adjustment subject color in the color image may be designated by a user's manual operation instead of using an automated extraction method that uses the above method or other methods.

The target color setting section 12 sets a target color serving as a target of the adjustment. The target color may be set by a user's manual operation. Alternatively, a method described in JP 2004-254303 A (corresponding to US 2004/0151370 A), the entire contents of which are incorporated herein by reference, may be used in which the target color is adjusted in accordance with a distance from the adjustment subject color.

Figure 2:
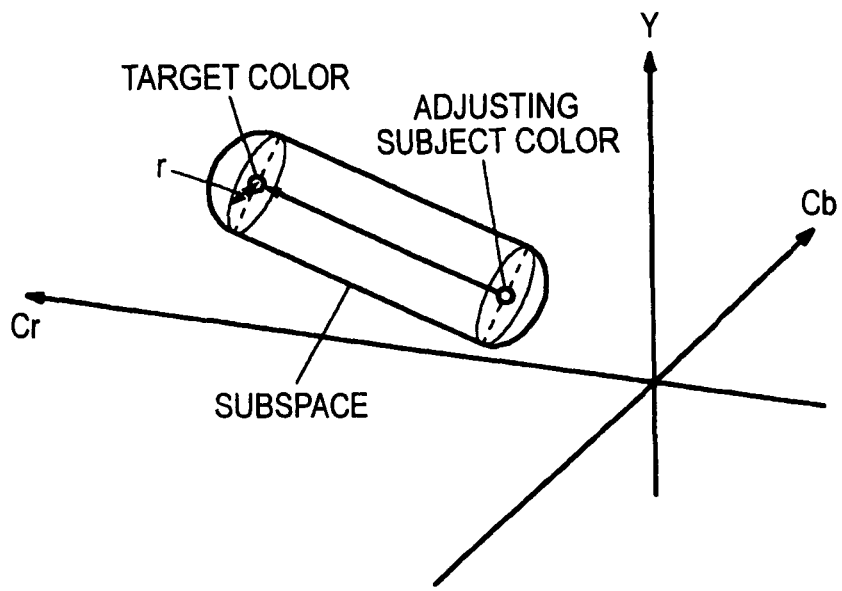
FIG. 2 is an explanatory diagram showing an example of a subspace.

The subspace setting section 13 sets a subspace so that the subspace includes the adjustment subject color extracted by the adjustment subject color extracting section 11 and the target color set by the target color setting section 12. FIG. 2 is an explanatory diagram showing an example of the subspace. In the example shown in FIG. 2, a YCbCr space is used as a color space, and the subspace has a capsule shape. Specifically, the subspace is obtained by combining (i) a sphere that has a radius r and has its center at the adjustment subject color, (ii) a sphere that has the radius r and has its center at the target color, and (iii) a cylinder that has the radius r and has a central axis extending along a line connected between the adjustment subject color and the target color.

Figure 3:
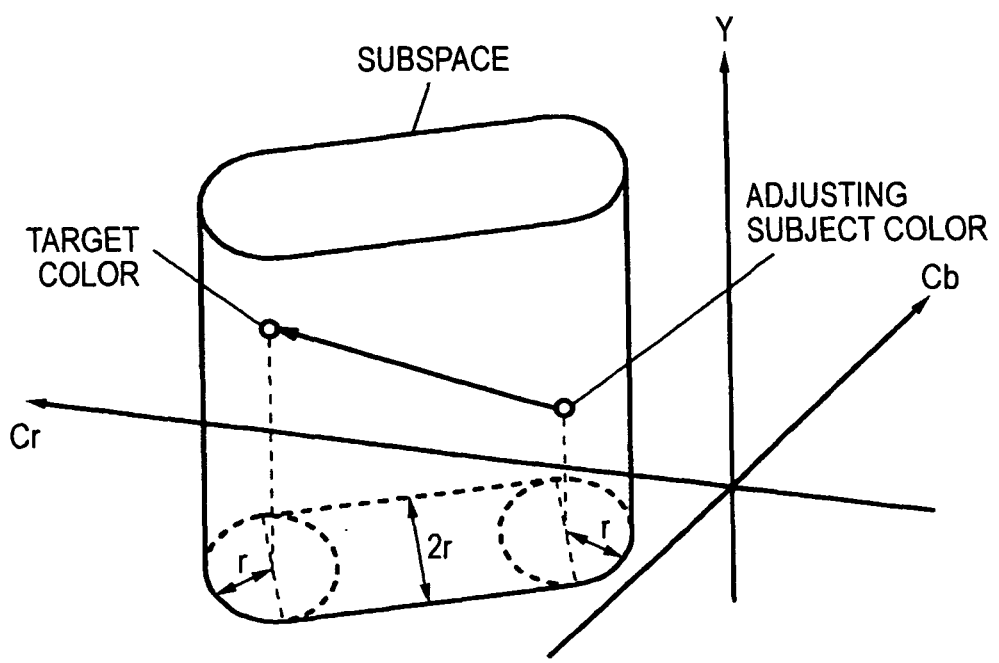
FIG. 3 is an explanatory diagram showing another example of the subspace.

FIG. 3 is an explanatory diagram showing another example of the subspace. In the example shown in FIG. 3, the subspace has a columnar shape that extends in the lightness (Y) direction. In a section of the subspace taken along the chromaticity (CbCr) plane, the subspace is defined as a region obtained by combining (i) a circle that has a radius r and has its center at the adjustment subject color, (ii) a circle that has the radius r and has its center at the target color, and (iii) a rectangle that has a width of 2 r and a length equal to a line connected between the adjustment subject color and the target color.

The subspaces shown in FIGS. 2 and 3 are merely illustrated as examples and may be set arbitrarily as long as the subspace includes the adjustment subject color and the target color.

Figure 4A:
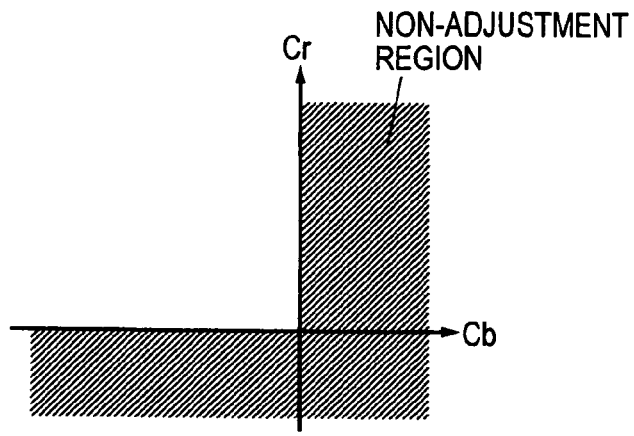
FIG. 4 is an explanatory diagram showing an example of a non-adjustment region.
Figure 4B:
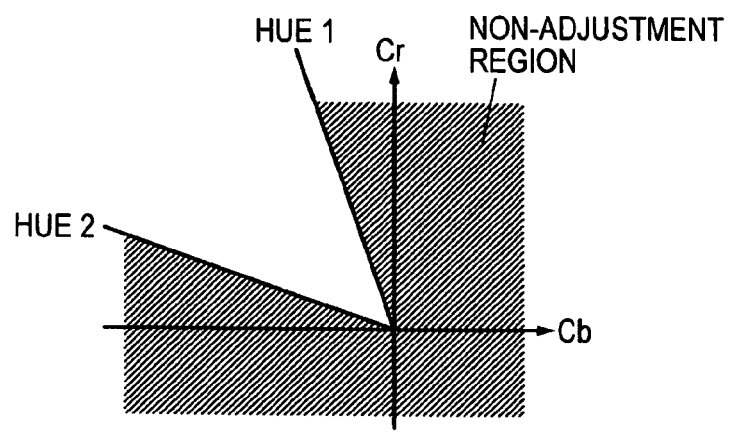
Figure 4C:
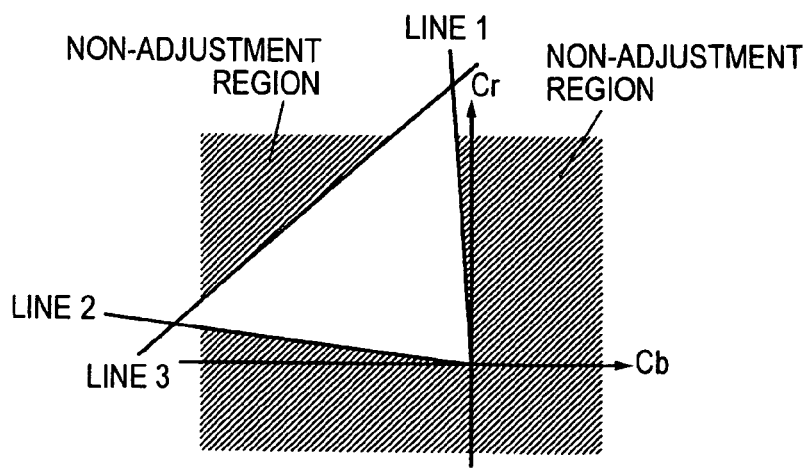

The non-adjustment region setting section 14 sets a non-adjustment region on which it is desired that the color adjustment does not have any influence. FIG. 4 is an explanatory diagram showing an example of the non-adjustment region. FIG. 4 shows the CbCr plane. In the example shown in FIG. 4A, a boundary of the non-adjustment region is set using a plane including the Cb axis and a plane including the Cr axis. The shaded region is the non-adjustment region, and the color adjustment does not have any influence on the shaded region. In the example shown in FIG. 4B, a boundary of the non-adjustment region is set using planes representing hues 1 and 2. The shaded region is the non-adjustment region, and the color adjustment does not have any influence on the shaded region. Accordingly, the color adjustment is performed for only a specific hue range. In the example shown in FIG. 4C, a boundary of the non-adjustment region are set using three planes including three straight lines 1 to 3. In this example, the hue range for the color adjustment is limited, and the color adjustment is not performed for high-saturation colors.

It should be noted that the non-adjustment regions shown in FIGS. 4A to 4C are merely illustrated as an example and may be set arbitrarily. Although the non-adjustment regions shown in FIGS. 4A to 4C are set in the CbCr plane, the non-adjustment region may be set in the lightness (Y) direction, for example. The number of planes or lines that define the boundary of the non-adjustment region may be set arbitrarily. The boundary of the non-adjustment region may be set using a curved surface in addition to a plane. For example, in a manner similar to the case of the subspaces shown in FIGS. 2 and 3, the non-adjustment region may be set inside or outside the capsule-shaped subspace or the columnar subspace.

The color adjustment section 15 performs the color adjustment for colors of the color image in the subspace set by the subspace setting section 13 while excluding the colors in the non-adjustment region set by the non-adjustment region setting section 14, based on a reference vector directing from the adjustment subject color extracted by the adjustment subject color extracting section 11 to the target color set by the target color setting section 12. To ensure continuity of colors between inside and outside of the subspace, the color adjustment is performed such that an adjustment amount at the boundary of the subspace is zero or close to zero and that the adjustment subject color is adjusted to the target color. If a portion of the non-adjustment region is in the subspace, a suppression ratio of each color is set based on a distance from each color in the subspace to the boundary of the non-adjustment region, and the color adjustment is performed in accordance with the suppression ratios. The suppression ratio is set such that the color adjustment is not performed for the colors in the non-adjustment region and on the boundary, in order to ensure continuity of colors between inside and outside of the non-adjustment region.

Figure 5:
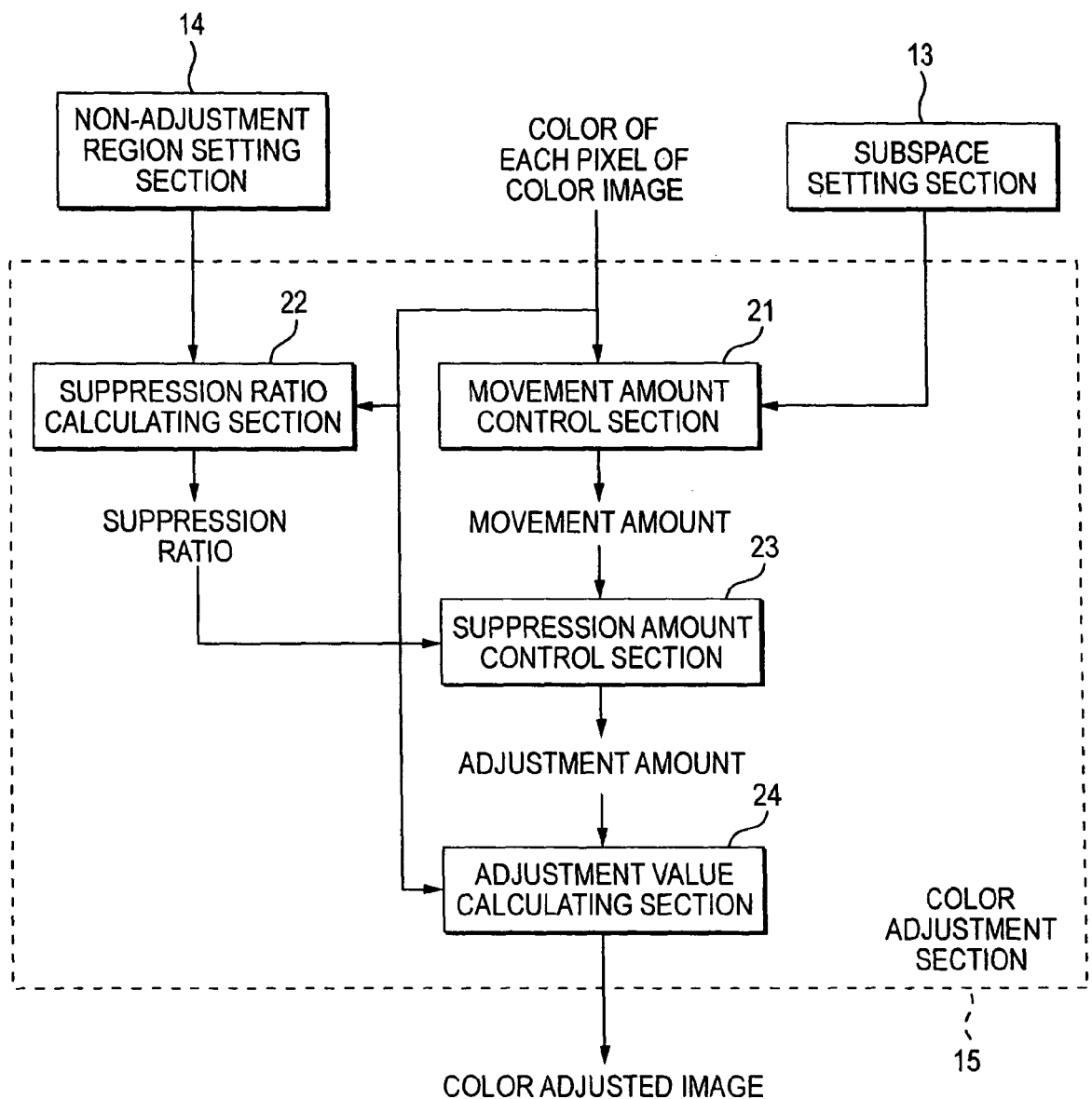
FIG. 5 is a block diagram showing an example of a color adjustment section.

FIG. 5 is a block diagram showing an example of the color adjustment section 15. In the drawing, reference numeral 21 is a movement amount control section, reference numeral 22 is a suppression ratio calculating section, reference numeral 23 is a suppression ratio control section, and reference numeral 24 is an adjustment value calculating section. The color adjustment section 15 receives a color value of each pixel of the color image. If the received color value belongs to the subspace, the color adjustment section 15 gives the color value to the movement amount control section 21, the suppression ratio calculating section 22, and the adjustment value calculating section 24, to perform the color adjustment. If the received color value does not belong to the subspace, the color adjustment section 15 outputs the color value as it is.

The movement amount control section 21 calculates a movement amount of a given color value in the subspace, which is set by the subspace setting section 13 without taking the non-adjustment region into consideration. The movement amount calculation is performed on the basis of a reference vector directing from the adjustment subject color to the target color. In addition, the movement amount calculation is performed such that continuity is ensured between colors inside the subspace and those outside the subspace and between colors before and after the movement and that inversion or gap of a color does not occur. In this exemplary embodiment, it is assumed that the color adjustment moves a given color C to F(C). Then, the movement amount M(C) is expressed by the following formula:

$$M(C)=F(C)-C$$

Figure 6:
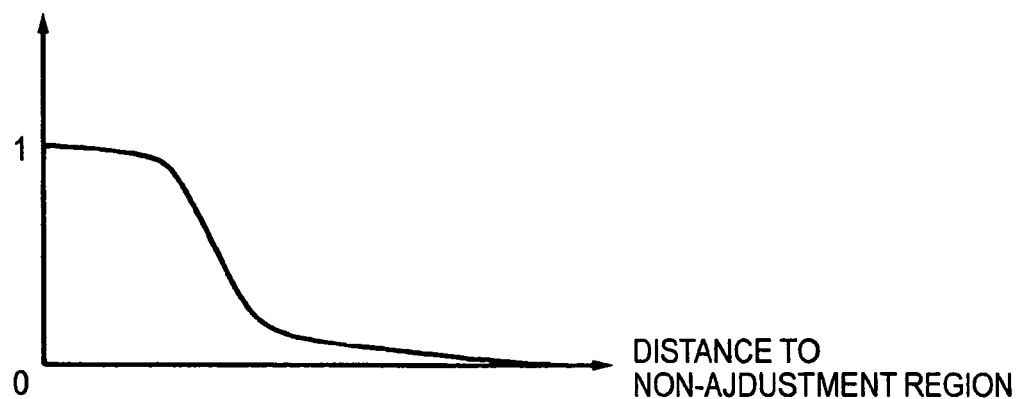
FIG. 6 is an explanatory diagram showing an example of a suppression ratio.

The suppression ratio calculating section 22 calculates a suppression ratio in accordance with the distance from each color in the subspace to the non-adjustment region. FIG. 6 is an explanatory diagram showing an example of the suppression ratio. The suppression ratio may be calculated on the basis of the distance from the non-adjustment region by using the function as shown in FIG. 6, for example. In the example shown in FIG. 6, it is assumed that the suppression ratio takes a value in a range of from 0 to 1. When the color adjustment is not performed for a certain color, the suppression ratio of the color takes 1, while when the color adjustment for a certain color is not suppressed, the suppression ratio of the color takes 0. Specifically, when a distance from the color to the non-adjustment region is equal to 0 (i.e., at a boundary of the non-adjustment region), the suppression ratio takes 1 so that the color adjustment is not performed for colors at the boundary of the non-adjustment region. On the other hand, a suppression ratio of a color far away from the non-adjustment region takes 0 so that the movement amount calculated by the movement amount calculating section 21 is used as it is. For colors in an intermediate region therebetween, the suppression ratio decreases monotonically as colors gets away from the non-adjustment region, in order to ensure continuity of colors. It is noted that a suppression ratio of each color in the non-adjustment region takes 1.

The function shown in FIG. 6 is expressed by the following formula:

$$w=1/(1+d^P)$$

where w denotes the suppression ratio of a color and d denotes the distance from the color to the non-adjustment region.

In the formula, p denotes a parameter for controlling the shape of the function. The distance d from a color to the non-adjustment region is measured from the color in question to the closest boundary of the non-adjustment region. It should be noted that this suppression ratio is merely an example, and the suppression ratio may be expressed using various other functions.

The suppression amount control unit 23 calculates an actual adjustment amount from the movement amount calculated by the movement amount control section 21, using the suppression ratio calculated by the suppression ratio calculating section 22. For example, when the movement amount calculated by the movement amount control section 21 is M(C), and when the suppression ratio calculated by the suppression ratio calculating section 22 is w (0≦w≦1), the adjustment amount M'(C) is expressed by the following formula:

$$M'(C)=(1-w)\cdot M(C)$$

The adjustment value calculating section 24 calculates a color value after the color adjustment is performed for the color image, in accordance with the adjustment amount calculated by the suppression ratio control section 23.

Specifically, an output color value C' is calculated by the following formula:

$$C'=C+M'(C)$$

where C denotes the color value of the color image, and M'(C) denotes the adjustment amount.

Hereinafter, the afore-mentioned configuration will be described with reference to specific examples. First, the adjustment subject color extracting section 11 extracts an adjustment subject color as an adjustment source from a given color image. Also, the target color setting section 12 sets a target color representing an adjustment destination of the adjustment subject color. Then, the subspace setting section 13 sets a subspace that includes the adjustment subject color and the target color and that represents a range of the color adjustment in which the color adjustment is to be performed.

Here, description will be made for the case in which the color adjustment is performed for a capsule-shaped subspace as shown in FIG. 2.

Figure 7:
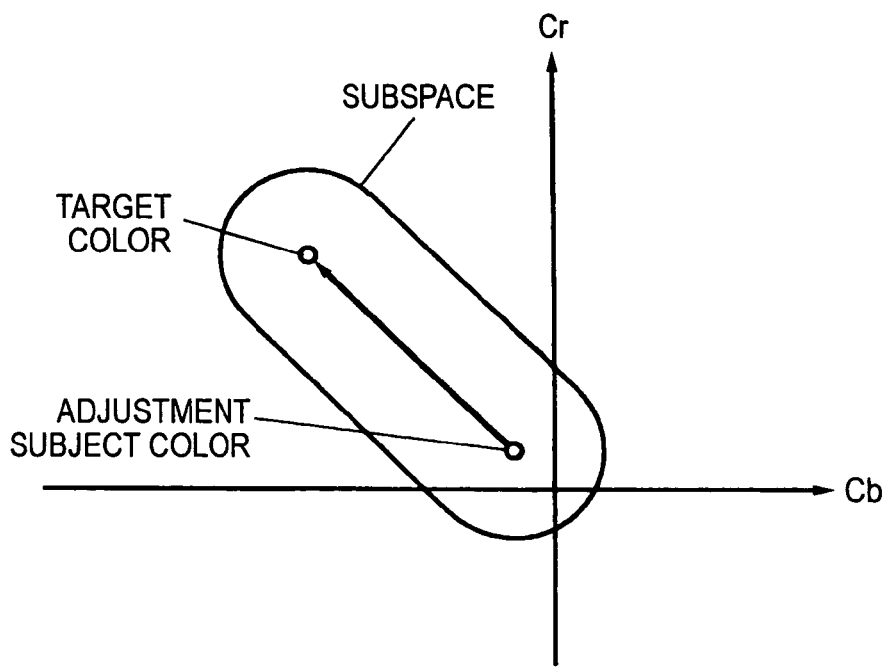
FIG. 7 is an explanatory diagram showing a specific example of the subspace set by a subspace setting section.

FIG. 7 is an explanatory diagram showing a specific example of the subspace set by the subspace setting section 13. In this example, it is assumed that the adjustment subject color and the target color have the same lightness Y values, and the figures only show the CbCr plane for that lightness value. In the example shown in FIG. 7, since the adjustment subject color has low saturation, the subspace includes the lightness axis (an intersection between the Cr axis and the Cb axis). For this reason, the subspace for which the color adjustment is to be performed may include colors having a hue absolutely different from that of the adjustment subject color. In the example shown in FIG. 7, the adjustment subject color belongs to a region where Cr is positive and Cb is negative. However, since the subspace includes other colors having negative Cr values and positive Cb values, the color adjustment is also performed for these colors having a hue different from that of the adjustment subject color, based on the reference vector directing from the adjustment subject color to the target color. For this reason, there is a possibility that some color may be adjusted to a color having an absolutely different hue. In the example shown in FIG. 7, the color adjustment would affect the entire low-saturation colors. Although the colors have low saturation, change in hue is easily recognized and thus the color adjustment is performed improperly.

Such a phenomenon occurs, for example, when a flesh color of a person in a photograph image that is taken against the sun is selected as an adjustment subject color. In this case, a region including colors similar to the flesh color of the person, such as a color of the soil or stones on the ground may be adjusted to the flesh color. If colors having a hue different from that of the flesh color occupy a wide range of the photograph image, change in hue in that region may become more conspicuous than that in a flesh region of the person. The same phenomenon often occurs when a low-saturation color is used as the adjustment subject color.

Figure 8:
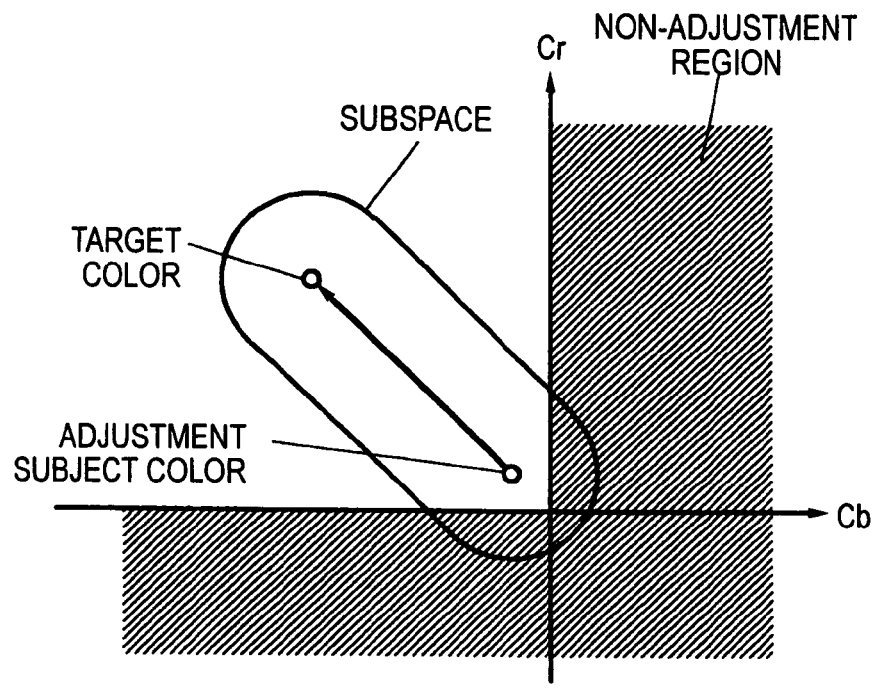
FIG. 8 is an explanatory diagram showing an exemplary relationship between the subspace and the non-adjustment region.

The non-adjustment region setting section 14 sets a non-adjustment region when the subspace set as described above includes a region in which it is not preferable to perform the color adjustment. FIG. 8 is an explanatory diagram showing an example of a relationship between the subspace and the non-adjustment region. For example, the non-adjustment region is set in the subspace shown in FIG. 7 by using the planes including the Cb axis and the Cr axis as shown in FIG. 4A or using the hue planes as shown in FIG. 4B. Thereby, the color adjustment is performed for a limited hue range. In the example shown in FIG. 8, the subspace is set as shown in FIG. 7 and furthermore, the non-adjustment region shown in FIG. 4A is set. By setting this non-adjustment region, the color adjustment is not performed for the non-adjustment region in the subspace. Accordingly, in the example shown in FIG. 8, the color adjustment does not cause great change in hue because colors in the subspace that have hues greatly different from or opposite to that of the adjustment subject color are included in the non-adjustment region.

In the above description, the non-adjustment region is set to a region where it is not preferable to perform the color adjustment. Alternatively, the non-adjustment region is set in the case where there is a region where it is desired not to perform the color adjustment may be set as the non-adjustment region, or conversely, it is desired to set a partial region as a color adjustment range. As described above, the non-adjustment region may be set in an arbitrary manner.

When the subspace and the non-adjustment region are set, the color adjustment section 15 adjusts the colors of the color image. The color adjustment is performed for each of the pixels that constitute the color image. Specifically, if a color of a pixel is included in the subspace, the color adjustment section 15 performs the color adjustment and outputs the adjusted color. On the other hand, if the color of the pixel is not included in the subspace, the color adjustment section 15 outputs the color as it is.

If the color of the pixel is included in the subspace, the movement amount control section 21 calculates the movement amount of the color without taking the non-adjustment region into consideration. The movement amount of the color may be calculated using the method described in JP 2004-112694 A (corresponding to US 2004/0057614 A), which will be described in brief. The entire contents of US 2004/0057614 A are incorporated herein by reference.

Basically, an adjustment subject color is moved to a target color using a vector directing from the adjustment subject color to the target color as a reference vector. A movement amount of each color decreases as each color approaches to the boundary of the subspace so that colors at the boundary of the subspace are not moved. In this case, the movement amount of each color is calculated such that an order of colors is not changed before and after the movement and that inversion of colors does not occur.

Figure 9A:
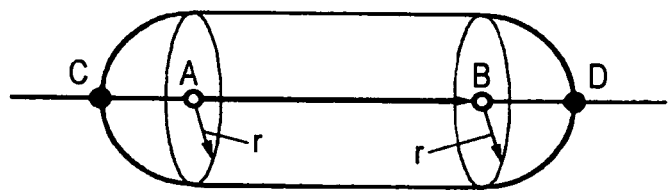
FIG. 9 is an explanatory diagram showing an example of a method for calculating a movement amount, performed by a movement amount control section.
Figure 9B:
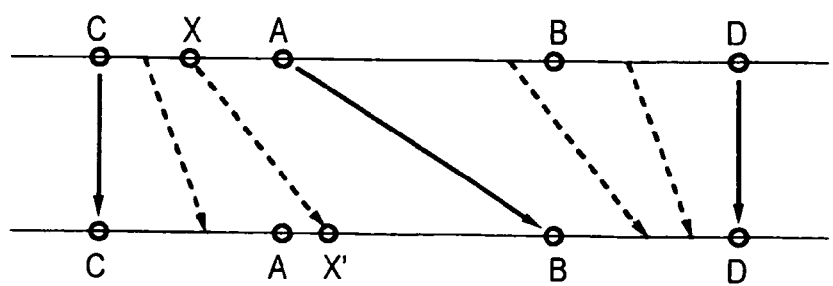

In order to realize the above movement, first, colors existing on the central axis line including the reference vector will be considered. FIG. 9 is an explanatory diagram showing an example of a movement amount calculating method performed by the movement amount control section 23. In FIG. 9A, a point A represents the adjustment subject color, a point B represents the target color, a point C represents a color one an intersection, closer to the adjustment subject color, between the central axis line and the boundary of the subspace, and a point D represents a color at another intersection, closer to the target color, between the central axis line and the boundary of the subspace. For the sake of illustration, a vector directing from the color A to the color B is expressed as TAB, and a movement vector of a color X existing on the central axis line is expressed as $\uparrow P(=\uparrow XX')$. As shown in FIG. 9B, since the color A is adjusted to the color B, a zone CA is mapped to a zone CB, and a zone AD is mapped to a zone BD. For example, since the color X belongs to the zone CA, the movement vector $\uparrow P$ of the color X is obtained by the following formula:

$$\uparrow P = CX/CA \cdot \uparrow AB$$

If the color X belongs to the zone AD, the movement vector $\uparrow P$ is obtained by the following formula:

$$\uparrow P = XD/AD \cdot \uparrow AB$$

Here, the movement vector $\uparrow P$ is weighted by the following formula:

$$\uparrow P = \alpha \cdot \uparrow AB$$

where $\alpha$ denotes a weight coefficient ($\alpha = CX/CA$ for the zone CA; $\alpha = XD/AD$ for the zone AD)

Furthermore, the movement vector $\uparrow P$ of the color X is adjusted such that the movement amount of the color X (a magnitude of the movement vector $\uparrow P$) decreases as the color X goes away from the central axis line including the reference vector, and that the movement amount of the color X becomes zero on the boundary of the subspace. Therefore, a weight coefficient $\beta$ is introduced in the following manner, wherein the weight coefficient $\beta$ is determined using the distance d from the color X to the central axis line.

$$\uparrow P = \alpha \cdot \beta \cdot \uparrow AB$$

For example, the weight coefficient $\beta$ may be calculated by the following formula:

$$\beta = 1 - (d/r)^2$$

Figure 10:
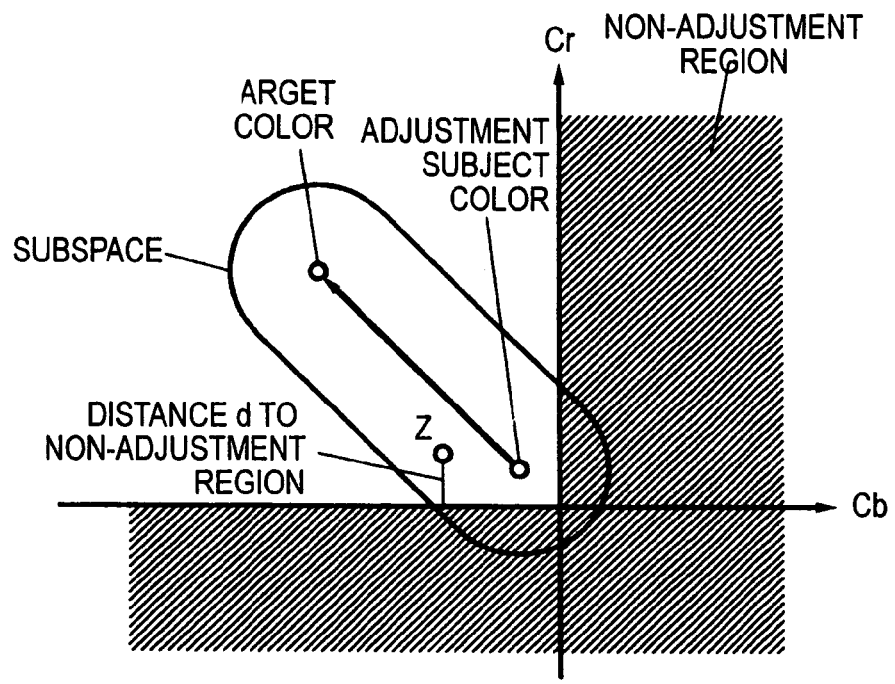
FIG. 10 is an explanatory diagram showing an example of a distance from the non-adjustment region.

The suppression ratio calculating section 22 calculates suppression ratios of the respective colors from the colors of the pixels. As described above, the suppression ratios may be calculated using the function as shown in FIG. 6, in accordance with the distances from the respective colors to the non-adjustment region. FIG. 10 is an explanatory diagram showing an example of the distance from each color to the non-adjustment region. In the example shown in FIG. 10, the subspace and the non-adjustment region are set as shown in FIG. 8. In the case in which the non-adjustment region is set using the plane including the Cb axis and the plane including the Cr axis, the smaller one of the distance from each color to the Cb axis and the distance from each color to the Cr axis is selected as the distance from each color to the non-adjustment region for calculation of the suppression ratio w of each color. That is, the distance can be calculated by the following formula:

$$d = \min(|Cb|, |Cr|)$$

where |Cb| denotes a distance from each color to the Cb axis is and |Cr| denotes a distance from each color to the Cr axis. For example, in the example shown in FIG. 10, with regard to a color Z in the subspace, a distance from the color Z to the Cb axis is adopted and then the suppression ratio of the color Z is calculated in accordance with this distance. It goes without saying that the distance is calculated in accordance with the set up non-adjustment region. The obtained suppression ratio of each color is set as w. For colors in the non-adjustment region, the suppression ratios of the respective colors are set to 1 so that the color adjustment is not performed for those colors.

When the movement amount (vector $\uparrow P$) for the case where the non-adjustment region is not taken into consideration and the suppression ratio w are calculated, the suppression amount control section 23 calculates the actual adjustment amount. The adjustment amount vector $\uparrow P'$ is simply calculated by multiplying the movement vector $\uparrow P$ by the suppression ratio w, as follows:

$$\uparrow P' = w \cdot \uparrow P$$

Then, the adjustment value calculating section 24 calculates an adjusted color to be output, by adding an original color of each pixel and the corresponding adjustment amount (vector). The adjusted color is obtained by the following formula:

$$C' = C + \uparrow P'$$

where C' denotes the color after the adjustment and C denotes the color before adjustment.

Figure 11:
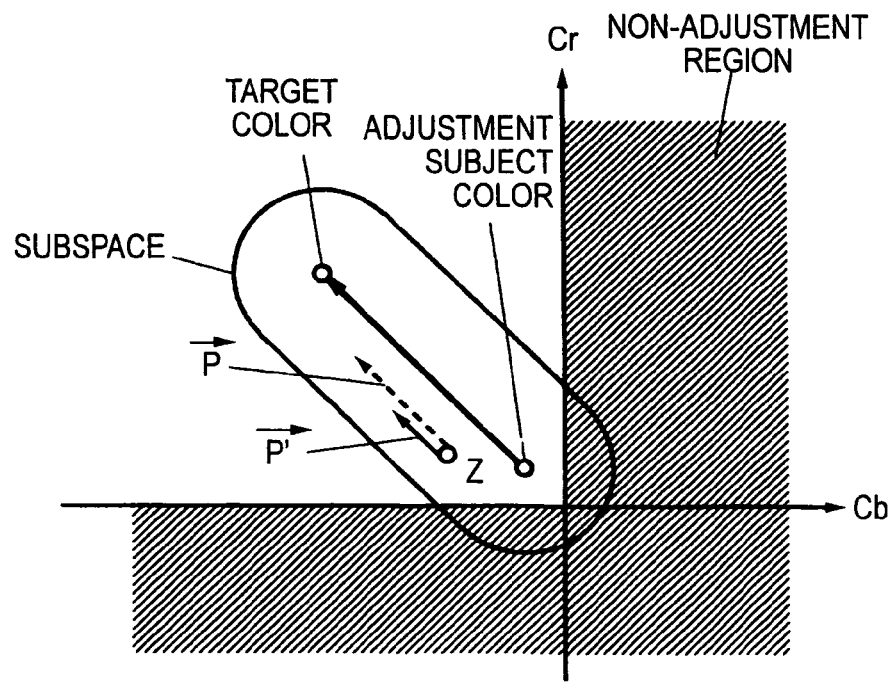
FIG. 11 is an explanatory diagram showing an exemplary relationship between the movement amount calculated by the movement amount control section and an adjustment amount calculated by a suppression amount control section.

FIG. 11 is an explanatory diagram showing an example of the relationship between the movement amount calculated by the movement amount control section 21 and the adjustment amount calculated by the suppression ratio control section 23. In the example shown in FIG. 11, a vector $\uparrow P$ represents a vector having the movement amount of a color Z calculated by the movement amount control section 21 without taking the non-adjustment region into consideration, and a vector $\uparrow P'$ is a vector having the adjustment amount obtained by controlling the movement amount based on a suppression ratio of the color Z that is calculated in accordance with a distance from the color Z to the boundary of the non-adjustment region. Although the vector $\uparrow P$ having the movement amount and the vector $\uparrow P'$ having the adjustment amount actually overlap each other, they are illustrated as parallel lines for the sake of illustration. In FIG. 11, the vector ↑P of the color Z is suppressed in accordance with the suppression ratio of the color Z, which is obtained based on the distance from the color Z to the boundary of the non-adjustment region. The color adjustment is performed for the color based on the vector ↑P' having the adjustment amount, and then the resultant color is output.

As a result of this color adjustment, colors having hues greatly different from the adjustment subject color are not adjusted because of the settings of the non-adjustment region. Also, such a color adjustment is performed that continuity between colors in the non-adjustment region and adjusted colors in the subspace excluding the non-adjustment region are ensured.

Figure 12:
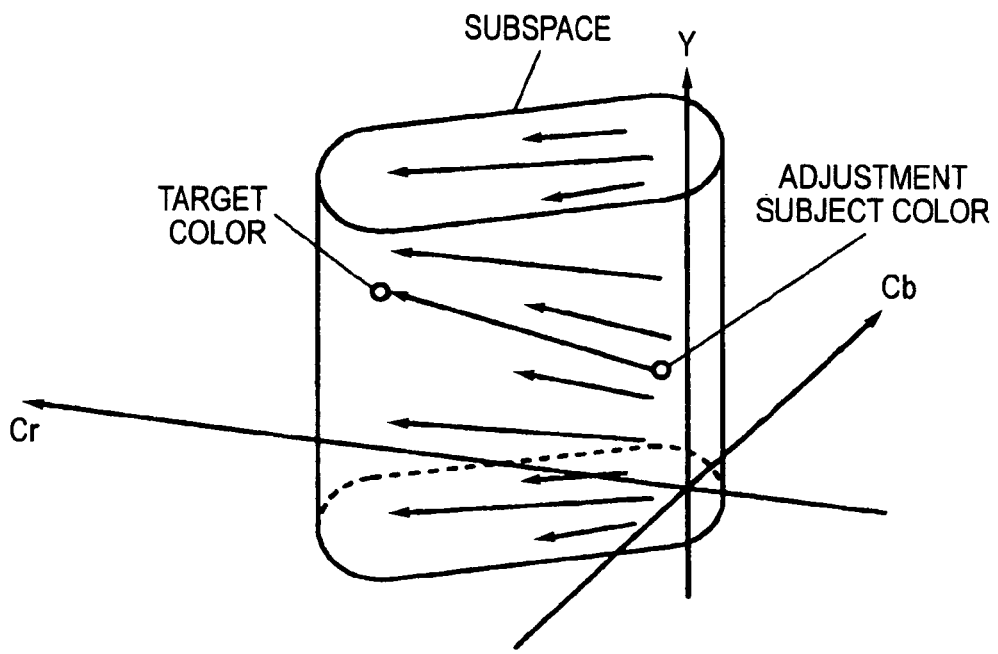
FIG. 12 is an explanatory diagram showing another specific example of the subspace set by the subspace setting section.

FIG. 12 is an explanatory diagram showing another specific example of the subspace set by the subspace setting section 13. In the example shown in FIG. 12, the subspace setting section 13 sets a subspace that has a columnar shape extending in the lightness (Y) direction. In the example shown in FIG. 12, since the adjustment subject color has low saturation and the subspace includes the lightness (Y) axis, the color adjustment would be performed for colors having hues greatly different from that of the adjustment subject color.

Figure 13:
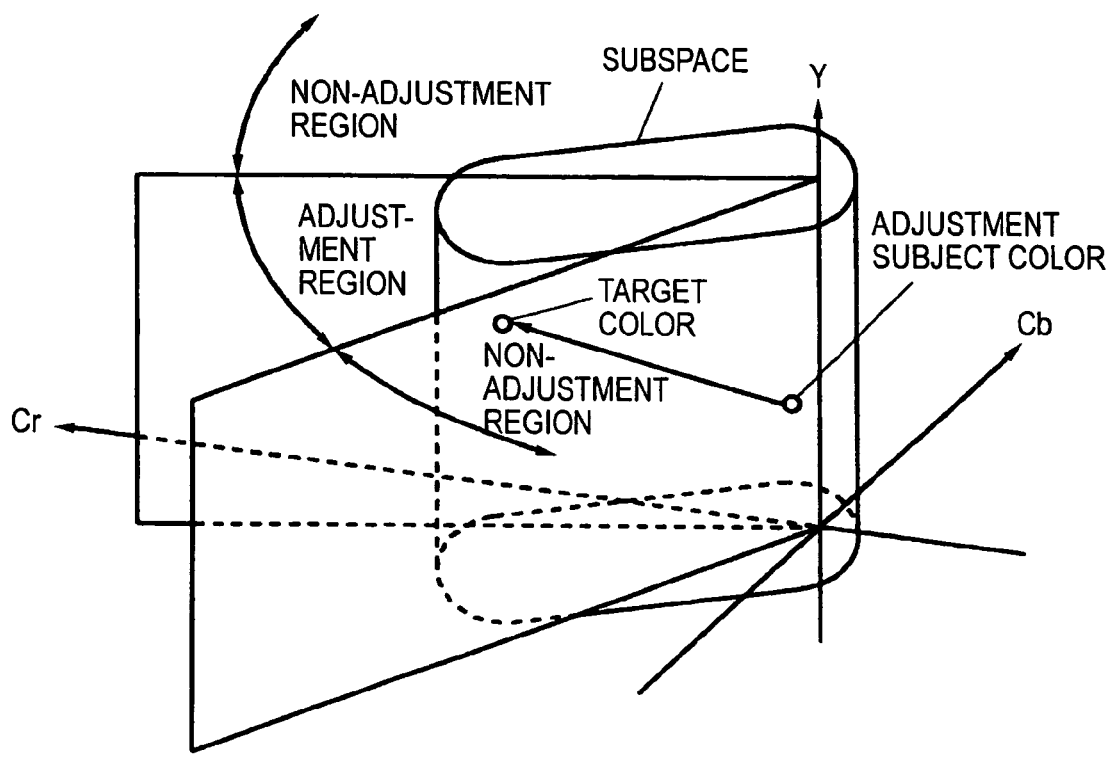
FIG. 13 is an explanatory diagram showing another example of the relationship between the subspace and the non-adjustment region.

Therefore, the non-adjustment region setting section 14 sets the non-adjustment region in which the color adjustment is not performed. FIG. 13 is an explanatory diagram showing another example of the relationship between the subspace and the non-adjustment region. In the example shown in FIG. 13, the boundary of the non-adjustment region is set using the hue planes as shown in FIG. 4B. The color adjustment is performed for a hue range that is indicated as an adjustment region in FIG. 13. By setting such hue planes, the color adjustment is performed only for the set hue range, and the color adjustment is not performed in the non-adjustment region. The non-adjustment region may be set in regions other than that shown in FIG. 13.

Figure 14:
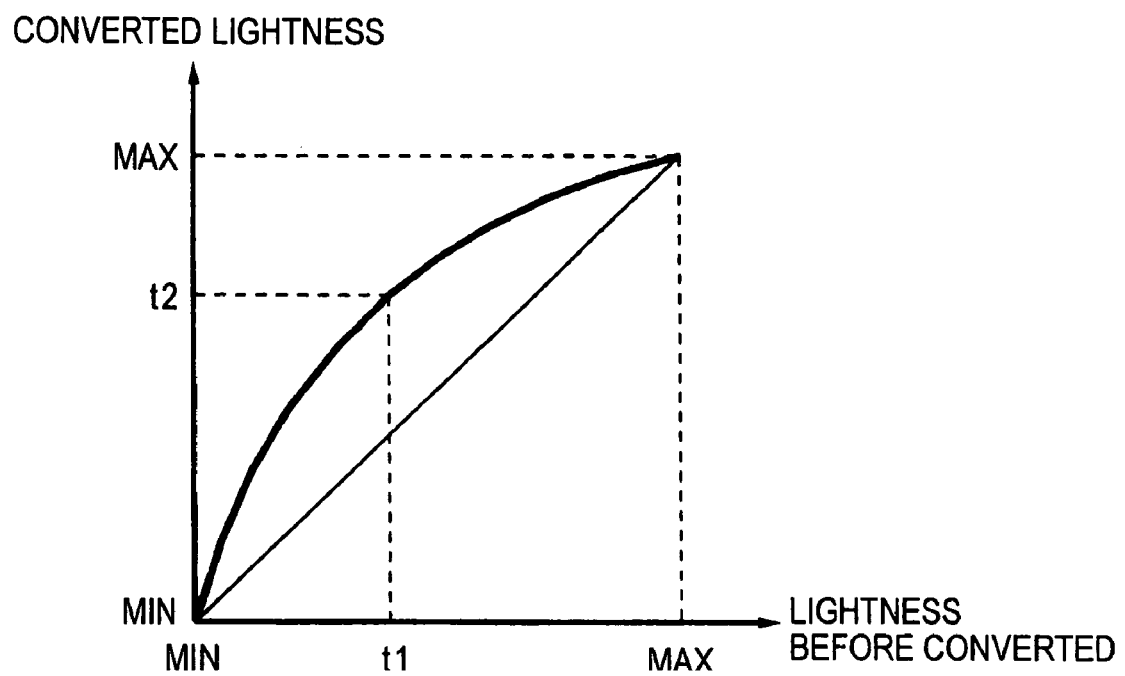
FIG. 14 is an explanatory diagram showing an example of a lightness conversion curve that is used when the movement amount control section calculates the movement amount.

In the case where the subspace has a columnar shape as shown in FIG. 12, the movement amount control section 21 may calculate the movement amount using the method described in JP 2006-135628 A (corresponding to US 2006/0119910 A), the entire contents of which are incorporated herein by reference. That is, for the chromaticity, a movement amount may be calculated using the method for calculating the movement amount in the capsule-shaped subspace, which is described with reference to FIG. 9. On the other hand, for the lightness, a movement amount may be calculated using a lightness conversion curve that converts a lightness of the adjustment subject color to a lightness of the target color to adjust the entire lightness. FIG. 14 is an explanatory diagram showing an example of the lightness conversion curve that is used when the movement amount control section 21 calculates the movement amount. In the example shown in FIG. 14, a smoothly varying curve that does not convert the minimum lightness and maximum lightness are not converted and converts a lightness t1 of the adjustment subject color to a lightness t2 of the target color is adopted as the lightness conversion curve. By calculating the movement amount in this manner, as shown by arrows in FIG. 12, with regard to the chromaticity, the movement amount decreases as each color approaches to the boundary of the subspace and colors on the side surfaces don't move, while with regard to the lightness, the movement amount increases as each color approaches to the reference vector and colors on the upper and lower sides don't change. By combining the movement amount regarding the chromaticity and the movement amount regarding the lightness, a three-dimensional movement amount vector ↑P is obtained.

The suppression ratio calculating section 22 calculates the suppression ratio w of each color. As described above, the suppression ratio w of each color is calculated in accordance with the distance from each color to the non-adjustment region, using the function shown in FIG. 6, for example. In the example shown in FIG. 13, the boundary of the non-adjustment region is set using two hue planes. In this case, a smaller length of vertical lines that connect a color in question to the two hue planes is selected as the distance from the color in question to the non-adjustment region for calculation of the suppression ratio w of the color in question.

When the movement vector ↑P for the case where the non-adjustment region is not taken into consideration is calculated by the movement amount control section 21 and the suppression ratio w is calculated by the suppression ratio calculating section 22, the suppression amount control section 23 calculates the adjustment amount by multiplying the movement amount vector ↑P and the suppression ratio w. Then, the adjustment value calculating section 24 calculates a color of each pixel after the color adjustment by adding the corresponding adjustment amount and the color of each pixel.

In the case of the columnar subspace, since the color adjustment is not performed in the non-adjustment region and its boundary, the color adjustment result is obtained based on the adjustment amount of each color, which is suppressed in accordance with the distance from each color to the non-adjustment region. Since the color adjustment is performed in the adjustment region shown in FIG. 13 and in a desired hue range, colors having hues greatly different from that of the adjustment subject color are not adjusted. In addition, continuity of colors is ensured between inside and outside of the subspace, and gap in colors does not occur.

Figure 15:
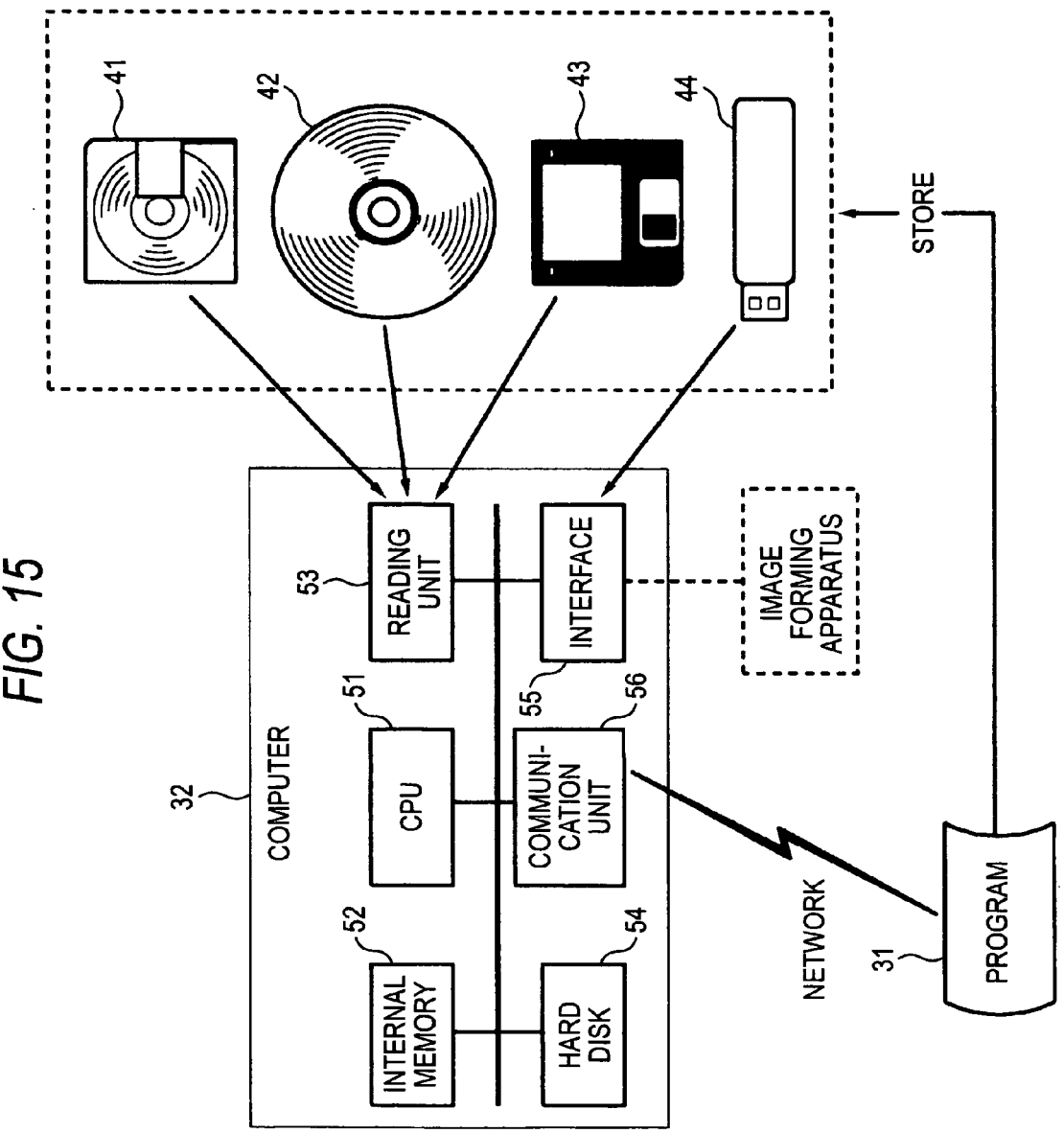
FIG. 15 is an explanatory diagram showing an example of a computer program, a recording medium for storing the computer program, and a computer when the functions of the exemplary embodiment are achieved by the computer program.
Figure 16:
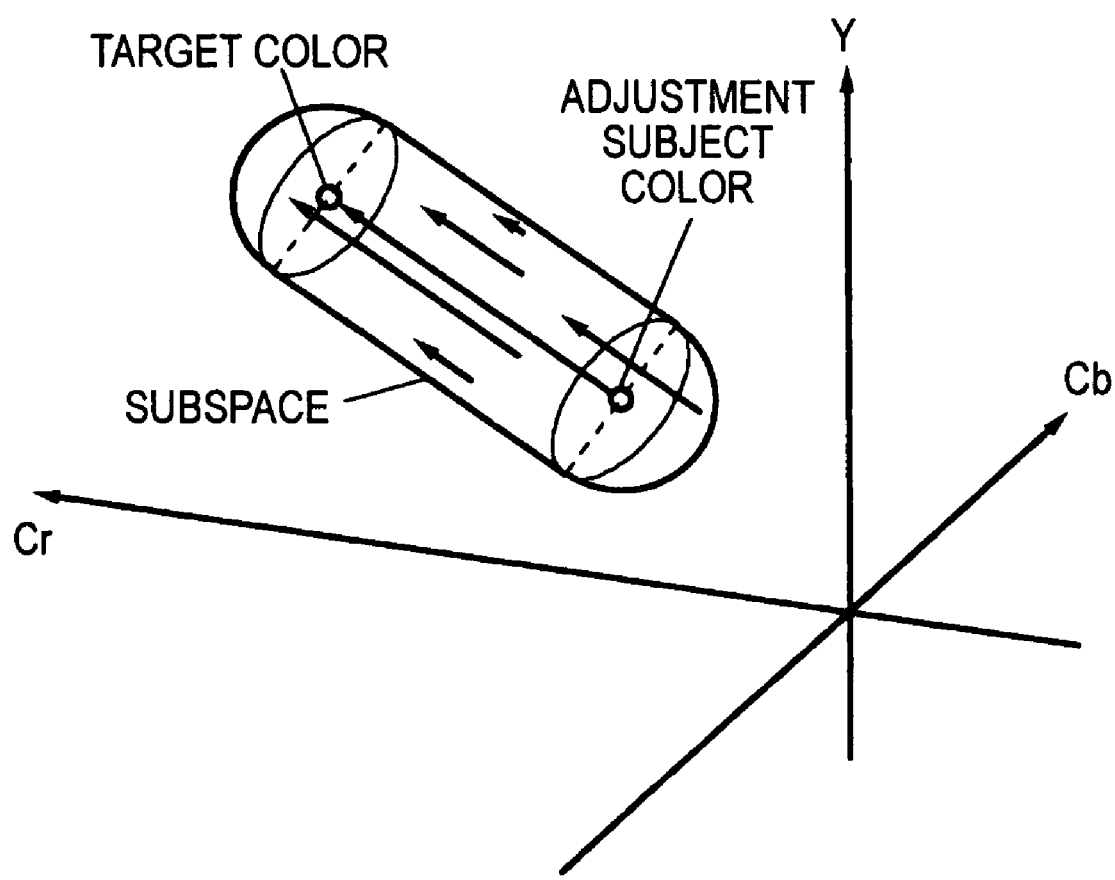
FIG. 16 is an explanatory diagram showing an example of a color adjustment method according to a related art.

FIG. 15 is an explanatory diagram showing an example of a computer program, a recording medium for storing the computer program, and a computer in the case where the above-described functions of the invention are achieved by the computer program. In the drawing, reference numeral 31 is a program, reference numeral 32 is a computer, reference numeral 41 is a magneto-optical disc, reference numeral 42 is an optical disc, reference numeral 43 is a magnetic disc, reference numeral 44 is a memory, reference numeral 51 is a CPU (Central Processing Unit), reference numeral 52 is an internal memory, reference numeral 53 is a reading unit, reference numeral 54 is a hard disk, reference numeral 55 is an interface, and reference numeral 56 is a communication unit.

Part or all of the function of each section described in the afore-described embodiments can be achieved by the program 31 which can be executed by the computer. In this case, the program 31 and data used by the program can be stored in a recording medium which can be read by the computer. The recording medium means a medium in which a state of change in energy such as magnetic energy, optical energy or electric energy is induced on the basis of the contents described in the program so that the descriptive contents described in the program can be transmitted in the form of a corresponding signal to the reading unit 53 provided to a hardware resource of the computer. Examples of the recording medium include the magneto-optical disc 41, the optical disc 42 (inclusive of CD and DVD), the magnetic disc 43, and the memory 44 (inclusive of an IC card and a memory card). These recording media are not limited to portable media.

After the program 31 is stored in these recording media in advance, these recording media may be mounted, for example, to the reading unit 53 of the computer 32 or the interface 55. Thereafter, the program 31 is read out from the computer and stored in the internal memory 52 or the hard disk 54 so that the program 31 is executed by the CPU 51, thereby realizing the functions described in the exemplary embodiment of the invention. Alternatively, after the program 31 is transmitted to the computer 32 via a network or the like, the computer 32 causes the communication unit 56 to receive the program 31 so that the program 31 is stored in the internal memory 52 or the hard disk 54 and is executed by the CPU 51, thereby realizing the functions described in the exemplary embodiment of the invention. The computer 32 may be connected to various other devices through the interface 55. For example, the computer 32 may be connected to an image forming device so that a color-adjusted image is formed by the image forming device. In addition, the computer 32 may be connected to a display device for displaying information or to an input device for allowing a user to input information to the computer.

Part or all of the function of the invention can be constructed by hardware. Alternatively, the function of the invention can be constructed by a program that includes the configuration of the invention in addition to other configurations.

What is claimed is:

1. A color adjustment apparatus comprising:
    a subspace setting unit that sets a subspace in a color space, the subspace including an adjustment subject color, which is an adjustment source, and a target color representing an adjustment destination;
    a non-adjustment region setting unit that sets a non-adjustment region in the color space, wherein a color adjustment is not performed in the non-adjustment region; and
    a color adjustment unit that performs the color adjustment for colors in the subspace set by the subspace setting unit, based on a reference vector directing from the adjustment subject color to the target color.

2. The apparatus according to claim 1, wherein the color adjustment unit performs the color adjustment for each color in the subspace based on (i) the reference vector and (ii) a suppression ratio of each color in the subspace that varies according to a distance from each color in the subspace to a boundary of the non-adjustment region set by the non-adjustment region setting unit.

3. The apparatus according to claim 2, wherein the color adjustment unit performs the color adjustment for each color in the subspace with increasing the suppression ratio of each color as each color approaches closer to the boundary of the non-adjustment region.

4. The apparatus according to claim 1, wherein:
    the color adjustment unit performs the color adjustment for each color in the subspace, based on a movement amount of each color,
    a maximum value of the movement amount of each color is equal to a magnitude of the reference vector, and
    the movement amount of each color approaches zero as each color approaches closer to a boundary of the subspace.

5. The apparatus according to claim 1, wherein the non-adjustment region setting unit sets at least one plane as a boundary of the non-adjustment region.

6. The apparatus according to claim 1, wherein the non-adjustment region setting unit sets two planes that represent hues, as a boundary of the non-adjustment region.

7. A color adjustment apparatus comprising:
    a color adjustment region setting unit that sets a color adjustment subject region, using at least one line segment in an arbitral CbCr plane, in which Y is constant, of a YCbCr color space; and
    a color adjustment unit that performs a color adjustment for each color in the color adjustment subject region in accordance with a color-adjustment movement amount of each color, wherein the color-adjustment movement amount of each color gets close to zero as each color approaches the at least one segment line.

8. A non-transitory computer-readable medium storing a program that causes a computer to execute a color adjustment process, the process comprising:
    setting a subspace in a color space, the subspace including an adjustment subject color, which is an adjustment source, and a target color representing an adjustment destination;
    setting a non-adjustment region in the color space, wherein a color adjustment is not performed in the non-adjustment region; and
    performing the color adjustment for colors in the set subspace, based on a reference vector directing from the adjustment subject color to the target color.

* * * * *